June 16, 1964 — M. G. TOWNSLEY — 3,137,199
SELF-THREADING PROJECTOR
Filed Dec. 19, 1960 — 3 Sheets-Sheet 1

Inventor
Malcolm G. Townsley
By Robert F. Miehle, Petty

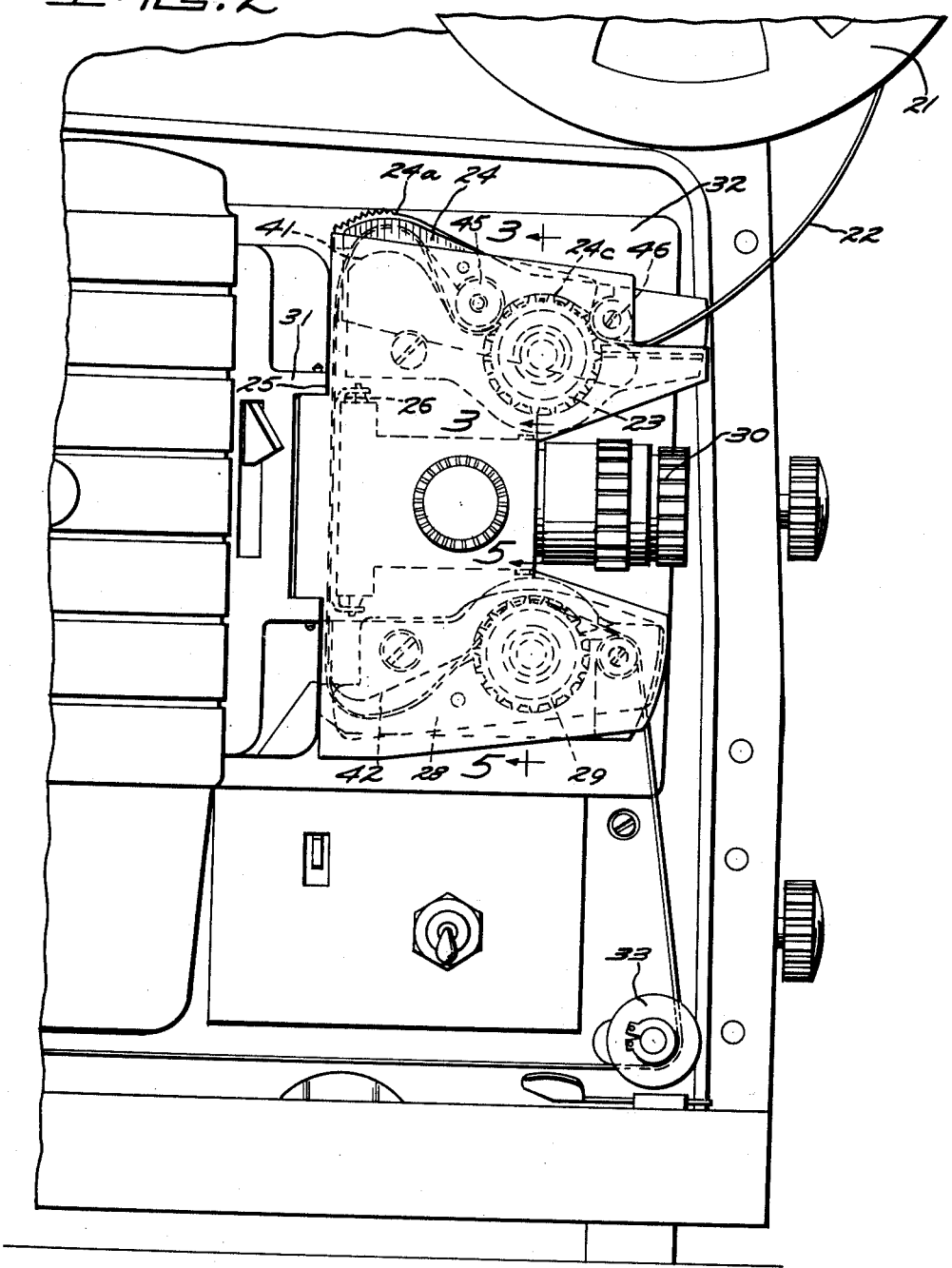

June 16, 1964

M. G. TOWNSLEY 3,137,199

SELF-THREADING PROJECTOR

Filed Dec. 19, 1960

Inventor
Malcolm G. Townsley
By Robert F. Miehle
Atty.

United States Patent Office 3,137,199
Patented June 16, 1964

3,137,199
SELF-THREADING PROJECTOR
Malcolm G. Townsley, Park Ridge, Ill., assignor to Bell & Howell Company, Chicago, Ill., a corporation of Illinois
Filed Dec. 19, 1960, Ser. No. 76,713
4 Claims. (Cl. 88—17)

This invention relates to a self-threading projector, and more particularly to a self-threading motion picture projector from which an intermediate portion of a film may be readily removed from the gate and repositioned therein.

An object of the invention is to provide a motion picture projector which threads film automatically and permits the portion of the film in the threading and gate portions of the projector to be removed therefrom and replaced therein.

Another object of the invention is to provide a motion picture projector having self-threading means and gate means normally retaining the film in the self-threading means and movable to a position permitting an intermediate portion of the film to be removed from and replaced in the self-threading means.

Another object of the invention is to provide a motion picture projector provided with a hinged gate having plates resiliently mounted thereon to serve as side flanges for self-threading guide sections when the gate is closed and permitting ready removal of the film from the self-threading guide sections when the gate is open.

A complete understanding of the invention may be obtained from the following detailed description of a self-threading motion picture projector, when read in conjunction with the appended drawings, in which:

FIG. 2 is a fragmentary, front elevation view of the projector of FIG. 1;

FIG. 3 is an enlarged, vertical sectional view taken along line 3—3 of FIG. 2;

FIG. 4 is an enlarged, vertical sectional view taken along line 4—4 of FIG. 3;

FIG. 5 is an enlarged, vertical sectional view taken along line 5—5 of FIG. 2; and FIG. 6 is an enlarged, fragmentary vertical sectional view, taken along line 6—6 of FIG. 5.

Figure 1:
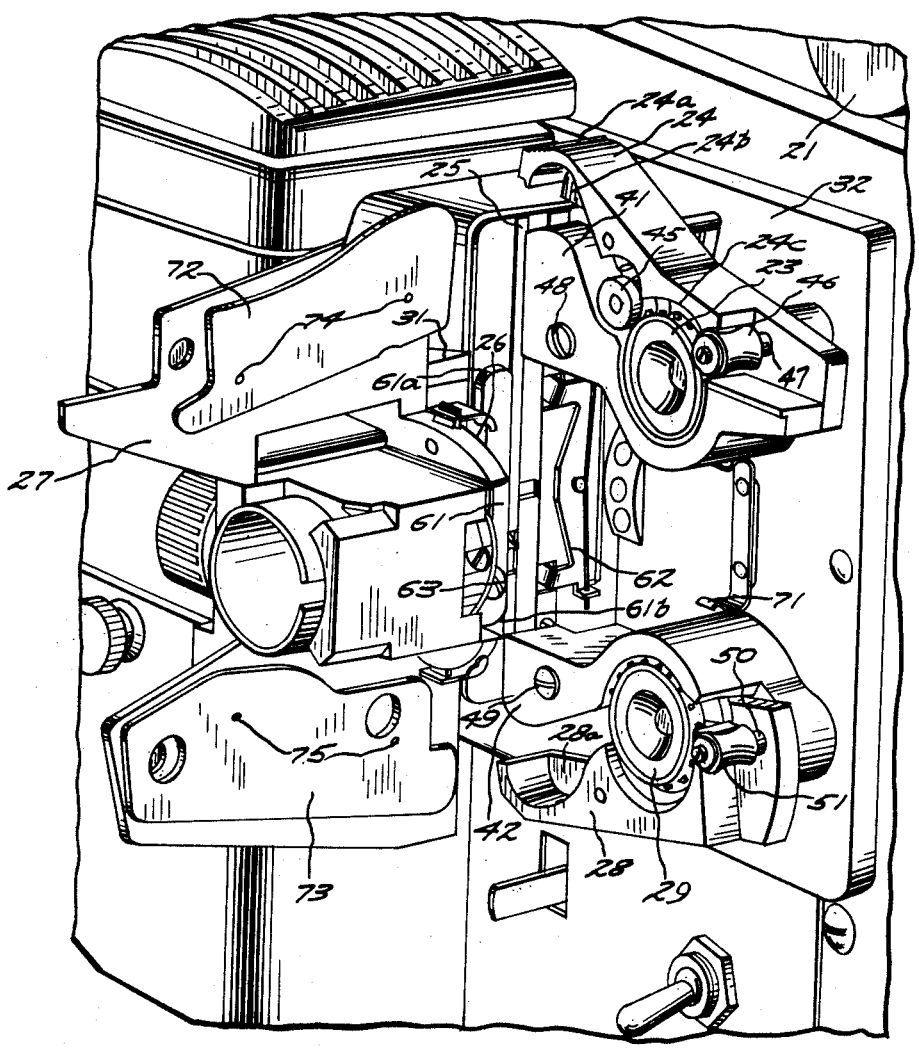
FIG. 1 is a perspective view of a self-threading motion picture projector forming one embodiment of the invention.

The invention provides a motion picture projector in which film is threaded automatically around an upper sprocket, along an upper loop former, through gate means, along a lower loop former and around a lower sprocket. The upper and lower loop formers are without side flanges and a hinged gate carries plates which fit against the side edges of the loop formers to act as side flanges when the gate is closed. The gate serves to retract the plates from the loop formers when the gate is opened to permit the film to be readily removed from and replaced in the loop formers and sprockets.

Referring now in detail to the drawings, the projector shown therein includes a supply reel 21 (FIG. 2) from which the forward end of a film 22 is drawn, automatically threaded through a path comprising an upper sprocket 23, pivotal upper loop former 24, between aperture plate 25 and pressure plate 26 carried by hinged gate 27, pivotal lower loop former 28 and lower sprocket 29. The hinged gate 27 carries lens 30 and is hinged to bracket 31 secured rigidly to mounting plate 32. The gate 27 may be swung to an open position, as shown in FIG. 1, to permit the intermediate portion of the film between the reel 21 and a guide roller 33 to be removed manually from the gate and sprockets to permit removal of sections of the film for splicing or rewinding and the intermediate portion of the film may be manually reinserted into the sprockets and gate area.

The loop formers 24 and 28 co-operate with fixed inner loop formers 41 and 42, respectively, to form the loops in the film, and the loop formers 24, 28, 41 and 42 are generally similar to the corresponding loop formers shown in co-pending application Serial No. 737,429, filed May 23, 1958, now Patent No. 3,029,686 and assigned to the common assignee, except that the loop formers 24 and 28 have no outer side flanges so that the film may be easily withdrawn laterally from these loop formers and the sprockets 23 and 24. The loop formers may be moved manually from retracted positions shown in FIG. 1 to loop-forming or threading positions shown in FIG. 2 by manually pressing knurled portion 24a downwardly. This downward movement of the loop former 24 swings the lower loop former upwardly through linkage 43 (FIGS. 3 and 5) and latches the loop formers 24 and 28 in their loop forming positions, the coupling, its operation, structure or linkage 43, and the latching structure being disclosed in detail in the above mentioned application Serial No. 737,429. The loop formers 24 and 28 are released and spring returned to their retracted positions by tension on the portion of the film traveling over roller 33 to the take-up reel (not shown) as disclosed in the co-pending application Serial No. 739,085, filed June 2, 1958, and assigned to the common assignee.

Sprocket guard rollers 45 and 46 mounted on fixed axes of rotation on the plate 32 normally hold the film in engagement with the teeth of the sprocket 23, but when the portions of the film to the left of the roller 45 and right of the roller 46 are pressed toward one another, permit the film to be completely disengaged from the sprocket teeth and pulled laterally from the sprocket and the rollers. The loop former 24 is pivotal on pin 47, which also mounts the roller 46. The loop former has arcuate portion 24c operable when the loop former 24 is in its threading position to guide the film around the sprocket 23 from the roller 46 to and under the roller 45 and hold the perforated film in engagement with the teeth of the sprocket 23 until the film travels under the roller 45. When the loop former 24 is in its retracted position, the arcuate portion 24c is spaced sufficiently from the sprocket teeth to permit the film to be manually disengaged from the sprocket teeth.

The inner loop former 41 is fixed rigidly to the mounting plate 32 by screw 48, and the inner loop former 42 is fixed rigidly to the mounting plate by screw 49 and pin 50 which also mounts sprocket guard roller 51 pivotally on the plate 32. The loop former 52 and the roller 51 are so spaced from the sprocket 24 that the stiffness of the film normally maintains the film interlocked with the teeth of the sprocket but when the portion of the film around the sprocket 24 is compressed manually the film moves out of engagement with the sprocket teeth and the film may be moved edgewise out from between the sprocket and the loop former 42 and roller 51.

An edge guide 61 has its rounded upper end 61a spaced substantially below the adjacent portion of the loop former 41, and the lower end 61b of the guide 61 is spaced substantially upwardly from the loop former 42. These spacings facilitate sliding the film edgewise from between the aperture plate 25 and the ends of the loop formers 41 and 42, which are spaced closely to the aperture plate. The edge guide 61 serves with known spring-pressed edge guide 62 to guide the film between the pressure plate 26 and aperture plate. The edge guide 61 is fixed to the aperture plate by screw 63.

The gate 27 is normally held in its closed position by spring latch 71, and may be deliberately swung manually away from the latch. Upper and lower edge guiding plates or flanges 72 and 73 (FIGS. 1, 3 and 5) are mounted resiliently on the gate 27 by screws 74 and 75 and springs 76 and 77, the heads of the screws being slidable in deep counterbores 27a and 27b. As illustrated in FIG. 3, when the gate is in its closed position, the plate 72 is pressed against the loop formers 24 and 41 and acts as an edge guide for the film, which is of particular importance during threading of the film around the sprocket 24 and to the gate area. Flange 24b of the loop former 24 co-acts with the guiding plate 72. Similarly, the edge guiding plate 73 coacts with inside flanges 28a and 42a of the loop formers 28 and 42 to guide the film from the gate area to and around the sprocket 24. The springs 77 urge the plate 73 lightly against the loop formers 28 and 42.

While the invention is thus described, it is not wished to be limited to the precise details described, as changes may be readily made without departing from the spirit of the invention.

What is claimed is:

1. In a self-threading motion picture projector including frame means, upper and lower sprockets rotatably mounted on the frame means and an aperture plate mounted on the frame means, the combination therewith of a pair of arcuate loop formers pivotally mounted on one side of the frame means for movement in a plane parallel to said one side of the frame means between an open and a closed position for threading film in the projector as the film is advanced by the upper sprocket, the loop formers being open at the sides thereof more remote from the frame means to permit edgewise movement of the film therefrom, a pressure plate, a hinged gate means carrying the pressure plate, and a pair of guide plates movable between open and closed positions and mounted on the gate means for covering the open sides of the loop formers to prevent edgewise movement of the film therefrom when the gate means is in its closed position.

2. The motion picture projector of claim 1 and including resilient means mounting said pair of guide plates on the gate means and serving to press said pair of guide plates against the loop formers.

3. In a self-threading motion picture projector including an upper sprocket, a lower sprocket, an aperture plate, a pressure plate and a hinged gate for moving the pressure plate to and from the aperture plate, the combination therewith of a pair of exterior loop formers for guiding film between the sprockets and the aperture plate, and guide plate means carried by the hinged gate serving when the gate is closed and the film is being guided by the loop formers as it is threaded through the projector to prevent edgewise travel of the film and being movable by the gate completely away from the loop formers to permit the film to be moved edgewise out of the loop formers.

4. In a self-threading motion picture projector, an aperture plate, an upper sprocket, a pair of sprocket guard members spaced from one another and normally serving to maintain a perforated film in mesh with the teeth of the sprocket, the sprocket guard members also permitting the film to be disengaged from the teeth of the sprocket and moved edgewise from between the sprocket and the guard members, a loop former movable between an operative position guiding the film from one guard member to the other guard member and from the last-mentioned guard member to the aperture plate and a retracted position, a pressure plate, hinged gate means for moving the pressure plate to and away from the aperture plate, and a guide plate member carried by the gate means and cooperating with the loop formers for preventing edgewise movement of the film out of the loop formers when the gate means is in a position holding the pressure plate adjacent to the aperture plate.

References Cited in the file of this patent

UNITED STATES PATENTS

| | | |
|---|---|---|
| 1,225,184 | Segel | May 8, 1917 |
| 1,315,355 | Wenderhold | Sept. 9, 1919 |
| 1,756,980 | Joy | May 6, 1930 |
| 1,958,475 | Frappier | May 15, 1934 |
| 2,070,325 | Victor | Feb. 9, 1937 |
| 2,327,776 | Fairbanks et al. | Aug. 24, 1943 |
| 2,472,143 | Briskin | June 7, 1949 |
| 2,621,558 | Spalding | Dec. 16, 1952 |
| 2,645,170 | Heidecke | July 14, 1953 |
| 3,063,610 | Briskin | Nov. 13, 1962 |

FOREIGN PATENTS

| | | |
|---|---|---|
| 470,065 | Canada | Dec. 12, 1950 |